United States Patent
Hatakeyama et al.

(10) Patent No.: US 9,385,642 B2
(45) Date of Patent: Jul. 5, 2016

(54) AIR CONDITIONER

(75) Inventors: Kazunori Hatakeyama, Tokyo (JP);
Takashi Yamakawa, Tokyo (JP);
Shinsaku Kusube, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 33 days.

(21) Appl. No.: 14/382,564

(22) PCT Filed: Mar. 7, 2012

(86) PCT No.: PCT/JP2012/055851
§ 371 (c)(1),
(2), (4) Date: Sep. 3, 2014

(87) PCT Pub. No.: WO2013/132620
PCT Pub. Date: Sep. 12, 2013

(65) Prior Publication Data
US 2015/0028780 A1    Jan. 29, 2015

(51) Int. Cl.
| H02P 6/00 | (2006.01) |
| H02P 6/24 | (2006.01) |
| H02P 6/20 | (2016.01) |
| F24F 11/00 | (2006.01) |
| F24F 1/38 | (2011.01) |
| H02P 1/02 | (2006.01) |

(52) U.S. Cl.
CPC ... *H02P 6/24* (2013.01); *F24F 1/38* (2013.01); *F24F 11/0079* (2013.01); *H02P 6/20* (2013.01); *H02P 1/029* (2013.01); *Y02B 30/746* (2013.01)

(58) Field of Classification Search
USPC .............. 318/400.1, 400.28, 400.21, 400.17, 318/400.26, 891
See application file for complete search history.

(56) References Cited

U.S. PATENT DOCUMENTS

| | | | | |
|---|---|---|---|---|
| 5,074,392 A | * | 12/1991 | Hasegawa ............... | F16D 48/06 192/103 R |
| 6,166,512 A | * | 12/2000 | Kojima ..................... | B60L 3/10 318/380 |
| 6,213,571 B1 | * | 4/2001 | Yamada .................. | B60L 7/006 188/158 |

FOREIGN PATENT DOCUMENTS

| JP | 63-240392 A | 10/1988 |
|---|---|---|
| JP | 11-332283 A | 11/1999 |
| JP | 2007-037382 A | 2/2007 |
| JP | 2009-284747 A | 12/2009 |
| JP | 2010-220303 A | 9/2010 |
| JP | 2011-109735 A | 6/2011 |

OTHER PUBLICATIONS

International Search Report of the International Searching Authority mailed Jun. 5, 2012 for the corresponding international application No. PCT/JP2012/055851 (and English translation).
Office Action mailed Jun. 23, 2015 issued in corresponding JP patent application No. 2014-503369 (and English translation).
Office Action dated Mar. 16, 2016 issued in the corresponding Chinese patent application No. 201280071151.5 (and English translation).

* cited by examiner

*Primary Examiner* — Bentsu Ro
*Assistant Examiner* — Iftekhar Mustafa
(74) *Attorney, Agent, or Firm* — Posz Law Group, PLC

(57) ABSTRACT

An air conditioner includes: an outdoor fan provided in an outdoor unit; a permanent magnet synchronous motor that drives the outdoor fan; an inverter that uses a DC power source as a power source and applies a voltage to the permanent magnet synchronous motor; an inverter control means that controls the output voltage of the inverter; and a shunt resist connected between the DC power source and the inverter. If the outdoor fan is rotating due to an external force while the inverter is stopped, the inverter control means causes the inverter to operate using a brake sequence that brakes the rotation of the outdoor fan, and then causes the inverter to operate using a drive sequence that power-drives the outdoor fan.

16 Claims, 11 Drawing Sheets

IN PWM MODE, UP, VP, AND WP ARE SET OFF, AND UN, VN, AND WN ARE SET ON

IN PWM MODE, UP, VP, AND WP ARE SET OFF, AND UN, VN, AND WN ARE SET ON

AIR CONDITIONER

CROSS REFERENCE TO RELATED APPLICATION

This application is a U.S. national stage application of International Patent Application No. PCT/JP2012/055851 filed on Mar. 7, 2012.

TECHNICAL FIELD

The present invention relates to an air conditioner.

BACKGROUND

In a control method of driving a motor, there is a technique of stopping a motor or maintaining the condition of the motor by igniting the motor with a rate set in advance, that is, a ratio of simultaneously igniting upper-side transistors of a power transistor that drives a motor for an emergency stop or a ratio of simultaneously igniting lower-side transistors of the power transistor (see, for example, Patent Literature 1).

Furthermore, there is a technique of preventing breakage of an inverter due to a regenerative voltage by causing line-to-line short-circuit between an inverter and a permanent magnet synchronous motor based on a regenerative voltage value generated when the permanent magnet synchronous motor is forcibly rotated (see, for example, Patent Literature 2).

PATENT LITERATURES

Patent Literature 1: Japanese Patent Application Laid-open No. 2007-37382
Patent Literature 2: Japanese Patent Application Laid-open No. 2009-284747

In the technique described in Patent Literature 1 mentioned above, a braking force is obtained by causing line-to-line short circuit between motors by simultaneously igniting upper-side transistors or lower-side transistors of a power transistor; however, when the rotation number of the motors becomes extremely high or extremely low, the braking force becomes lowered, and for example, in a case of a motor that is driven by a certain level of torque generated by an external force, it is difficult to completely stop the motor. Note that when the transistors are ignited with a certain ratio, the direct-current voltage of an inverter is raised by repetitions of ignition and arc-extinguishing, and this voltage rise may cause circuit breakage. Further, when the ignition ratio is set to be 100%, a transient current due to the ignition is generated, and in a case of using a permanent magnet synchronous motor, there is a possibility of reduction of motor efficiency caused due to the generation of irreversible flux losses.

Further, in the technique described in Patent Literature 2 mentioned above, the inverter is protected from a regenerative voltage by causing line-to-line short circuit between permanent magnet synchronous motors by, as lower arms of the inverter are turned ON and OFF, repeating open circuit and short circuit and gradually extending the ratio of the short circuit. However, when there is a short-circuit fault on upper arms of the inverter and the ratio of the short circuit is small, even if a short-circuit current passes through the lower arms with a short ON-time, a protection circuit of the inverter cannot respond to the short-circuit current, and there is a possibility that the inverter is destroyed. In addition, in the technique described in Patent Literature 2, while line-to-line short circuit is caused between permanent magnet synchronous motors so as to protect the inverter from a regenerative voltage, when a regenerative voltage high enough to break the inverter is generated, the permanent magnet synchronous motors are rotating at a high speed, and thus an inductance component thereof is increased and the power factor thereof is degraded, so that, when line-to-line short circuit is caused between the permanent magnet synchronous motors, a lot of braking power is unable to be obtained. That is, the line-to-line short circuit is unable to stop the movement of the permanent magnet synchronous motors, and as a result, a short-circuit current keeps flowing so as to maintain the short circuit state for a long time. Therefore, not only there is a possibility of breakage of the inverter due to heat generation in inverter elements, insulation failure due to heat generation in the permanent magnet synchronous motors, and irreversible flux loss, but also there is a possibility of damage on rotors and the like due to a braking force at the time of short circuit.

SUMMARY

The present invention has been made in view of the above problems, and an object of the present invention is to provide an air conditioner that is capable of safely and securely braking a permanent magnet synchronous motor, when an outdoor fan of the air conditioner is rotated by an external force, and is capable of securely shifting its mode to power running mode.

To solve the problem and achieve the object mentioned above, the present invention relates to an air conditioner in which an indoor device and an outdoor device are separately provided. The air conditioner includes: an outdoor fan that is provided in the outdoor device; a permanent magnet synchronous motor that drives the outdoor fan; an inverter of which power is supplied from a direct-current power supply and which applies a voltage to the permanent magnet synchronous motor; an inverter control unit that controls a voltage output from the inverter; and a current detection unit that is connected between the direct-current power supply and the inverter. The inverter control unit, in a case where the outdoor fan is rotated by an external force when the inverter is stopped, operates the inverter by a brake sequence that brakes a rotation of the outdoor fan, and thereafter operates the inverter by a drive sequence that performs power running of the outdoor fan.

In the air conditioner according to the present invention, it is configured that, when an outdoor fan is rotated by an external force, its mode is shifted to power running after the rotation is decreased by a braking operation, so that the air conditioner can make secure and swift shifting of its mode to power running mode.

DETAILED DESCRIPTION

Exemplary embodiments of an air conditioner according to the present invention will be explained below in detail with reference to the accompanying drawings. Note that the present invention is not limited to the embodiments.

First Embodiment

Figure 1:
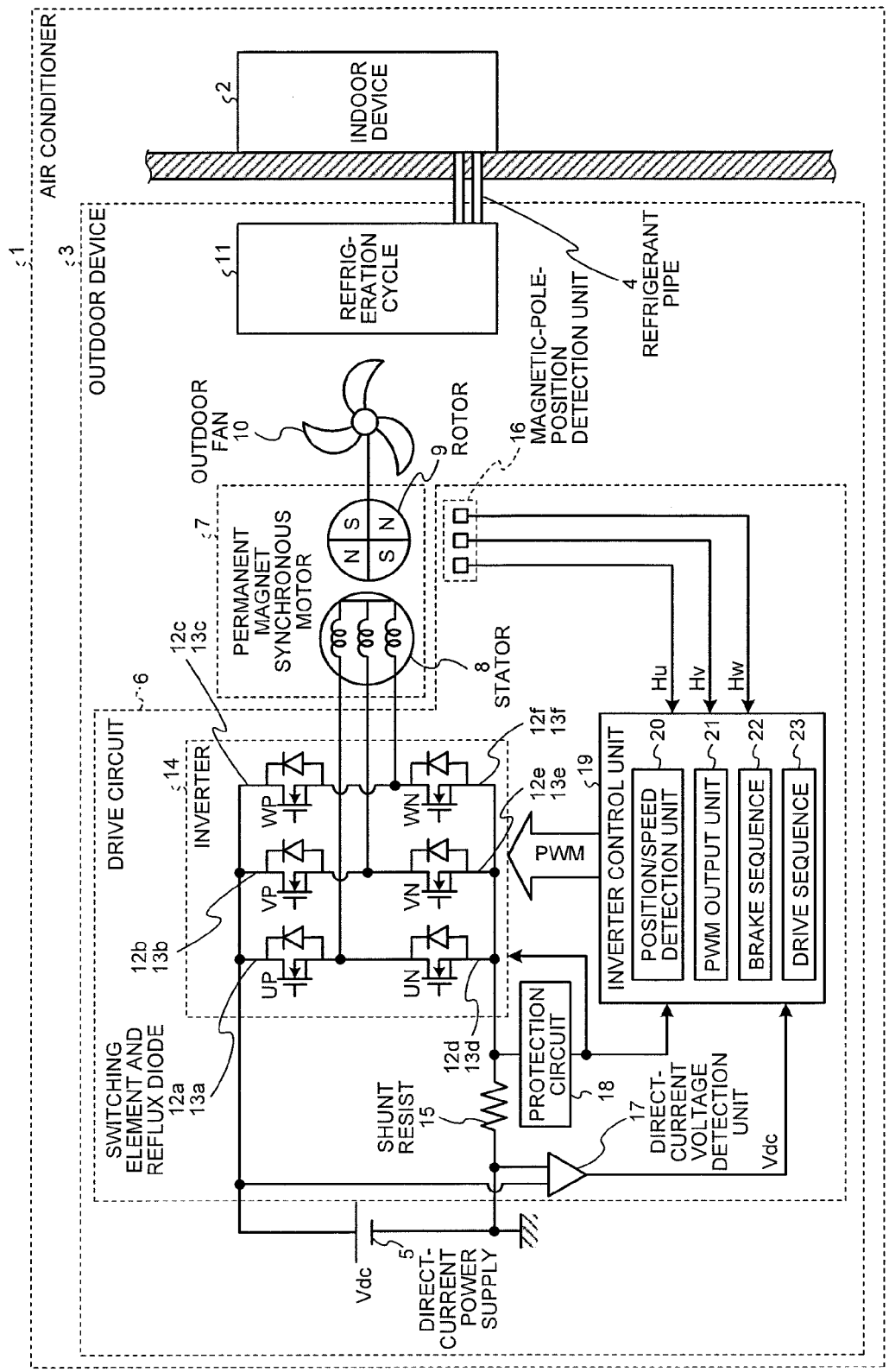
FIG. 1 is a diagram illustrating an air conditioner according to an embodiment.

FIG. 1 is a diagram illustrating a configuration of an air conditioner 1 according to an embodiment of the present invention. As shown in FIG. 1, in the air conditioner 1 according to the present embodiment, an indoor device 2 and an outdoor device 3 are connected via a refrigerant pipe 4. The outdoor device 3 is configured such that, by applying a voltage on a stator 8 of a permanent magnet synchronous motor 7 by a drive circuit 6 having a direct-current voltage Vdc from a direct-current power supply 5 as a power supply, a rotating magnetic field is generated and a rotor 9 is rotated and driven, and an outdoor fan 10 connected to the rotor 9 is rotated to generate a wind and the wind is sent to a heat exchanger (not shown) of a refrigeration cycle 11 so as to perform heat exchange, thereby performing a cooling and heating operation.

The drive circuit 6 includes an inverter 14 that is constituted by switching elements 12a to 12f and reflux diodes 13a to 13f, a shunt resist 15 that is arranged between the direct-current power supply 5 and the inverter 14, a magnetic-pole-position detection unit 16 that detects a magnetic pole position of the rotor 9 of the permanent magnet synchronous motor 7, a direct-current voltage detection unit 17 that detects a voltage of the direct-current power supply 5, a protection circuit 18 that detects a current flowing in the inverter 14 based on a voltage of the shunt resist 15 so as to protect the inverter 14, and an inverter control unit 19 that controls a voltage to be applied to the permanent magnet synchronous motor 7 by outputting PWM signal for driving the switching elements 12a to 12f of the inverter 14 based on respective detection values.

Figure 2:
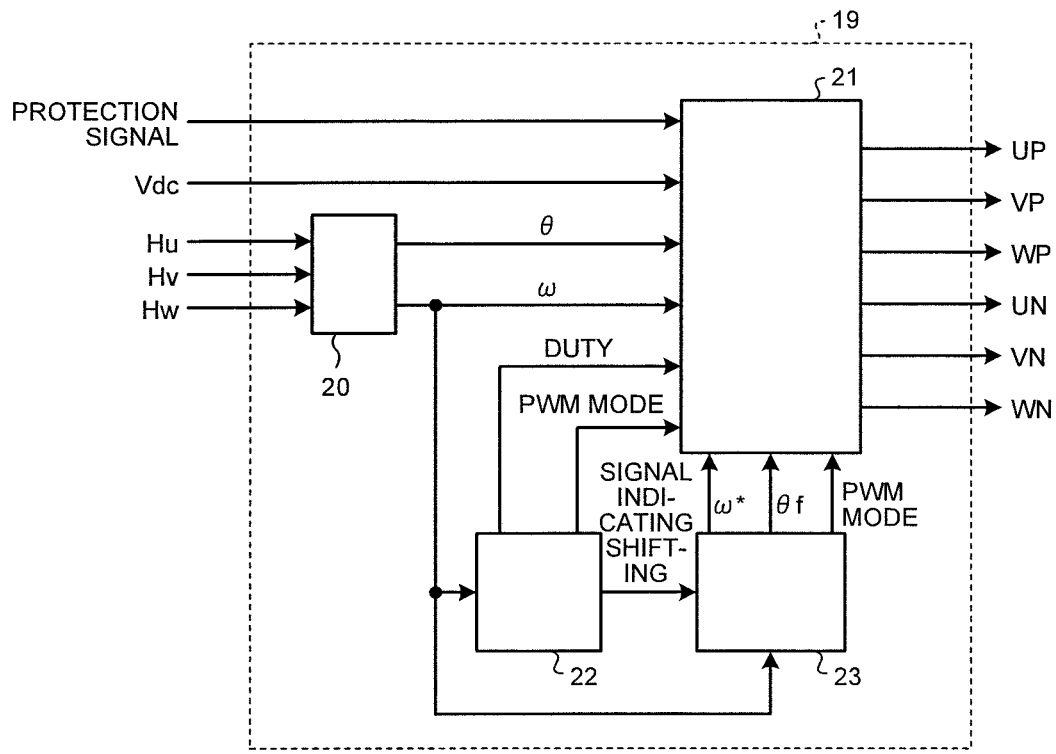
FIG. 2 is a diagram illustrating a configuration of an inverter control unit.

As shown in FIG. 2, the inverter control unit 19 includes a position/speed detection unit 20, a PWM output unit 21, a brake sequence 22, and a drive sequence 23. The position/speed detection unit 20 outputs a magnetic pole position $\theta$ and an electrical angle frequency $\omega$ based on magnetic-pole-position signals Hu, Hv, and Hw. The brake sequence 22 outputs a PWM mode in which line-to-line open circuit or line-to-line short circuit of the permanent magnet synchronous motor 7 are caused based on the electrical angle frequency $\omega$, and also outputs a time ratio (DUTY) of repetition of open circuit and short circuit. The drive sequence 23 outputs an electrical-angle frequency command $\omega^*$, a lead angle $\theta f$, and the PWM mode for driving a motor based on the electrical angle frequency $\omega$. The PWM output unit 21 outputs PWM signals (UP, VP, WP, UN, VN, WN) based on a protection signal, the direct-current voltage Vdc, the magnetic pole position $\theta$, the electrical angle frequency $\omega$, the electrical-angle frequency command $\omega^*$, the lead angle $\theta f$, the PWM mode, and the DUTY.

Figure 3:
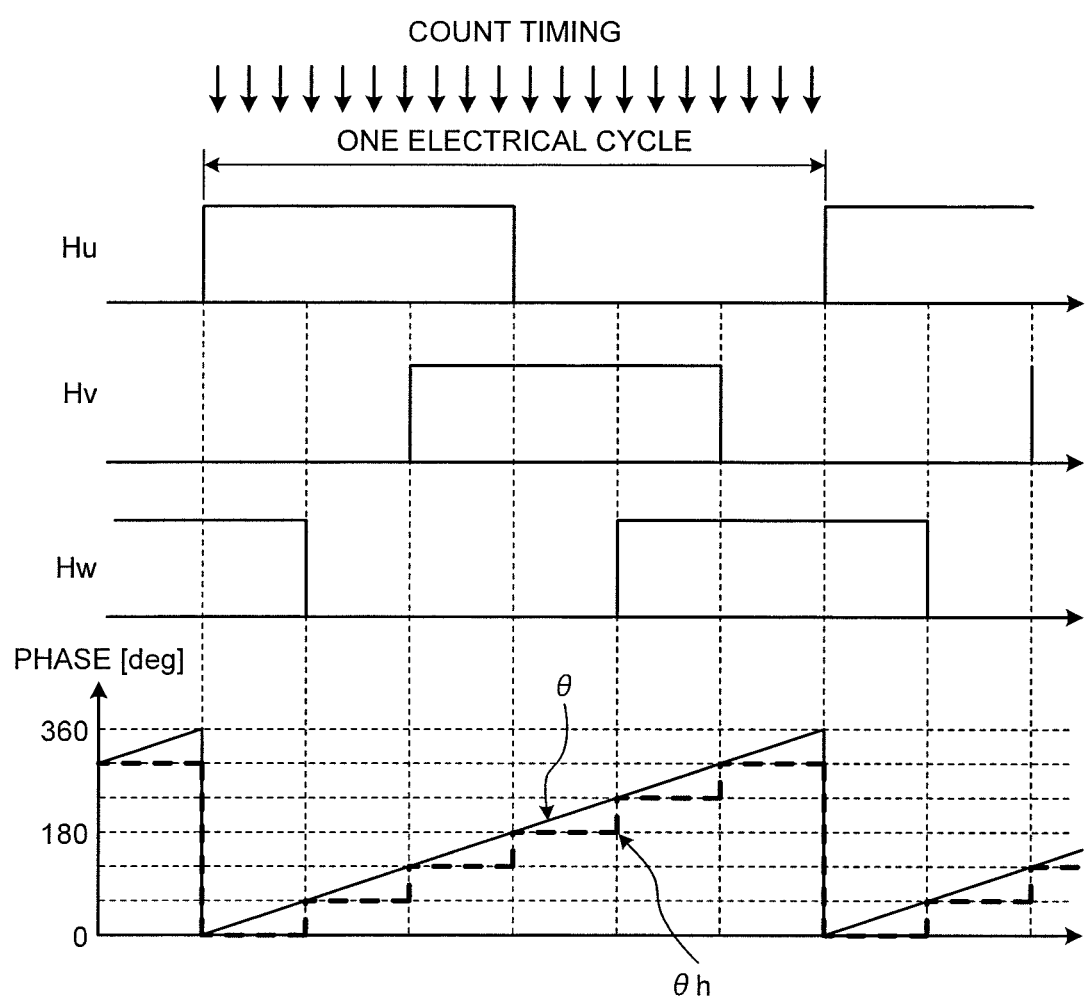
FIG. 3 is a diagram illustrating an operation of a position/speed detection unit.

Next, operations of the position/speed detection unit 20 are explained with reference to FIG. 3. For example, when a Hall sensor is used as the magnetic-pole-position detection unit 16, the magnetic-pole-position detection unit 16 repeats HIGH (=1) and LOW (=0) by approximately 180 (deg) according to the magnetic pole position of the rotor 9 of the permanent magnet synchronous motor 7, and then signals respectively having a phase difference of 120 degrees in a UVW phase thereof are output. A time from rise of a U phase to another rise thereof becomes one electrical cycle that is counted in every control cycle Ts which is a discrete time of a microcomputer and the like during the period. In this case, when the number of count is n, the one electrical cycle can be expressed by n×Ts, and an electrical frequency can be obtained by calculating the reciprocal of n×Ts. Furthermore, the electrical angle frequency $\omega$ of the permanent magnet synchronous motor 7 can be obtained by further multiplying $2\pi$ thereto. Note that, by dividing the electrical angle frequency $\omega$ by the number of pair of poles of the permanent magnet synchronous motor 7, it is also possible to obtain a mechanical angle frequency.

Next, a method of obtaining the magnetic pole position $\theta$ in a case where the rise of the Hall sensor output Hu of a U phase is set to be 0 degree is explained. When the rise of the Hall sensor output Hu of a U phase is set to be 0 degree, $\theta h$ is detected supposing that (Hu, Hv, Hw)=(1, 0, 1) is 0 (deg), (Hu, Hv, Hw)=(1, 0, 0) is 60 (deg), . . . , and (Hu, Hv, Hw)=(0, 0, 1) is 300 (deg). Because $\theta h$ changes in a stepwise manner, by obtaining an angle to be added in every control cycle Ts based on the electrical angle frequency $\omega$ obtained as described above so as to be added to $\theta h$, a linearly changing magnetic pole position $\theta$ from 0 (deg) to 360 (deg) can be obtained as shown in FIG. 3.

Figure 4:
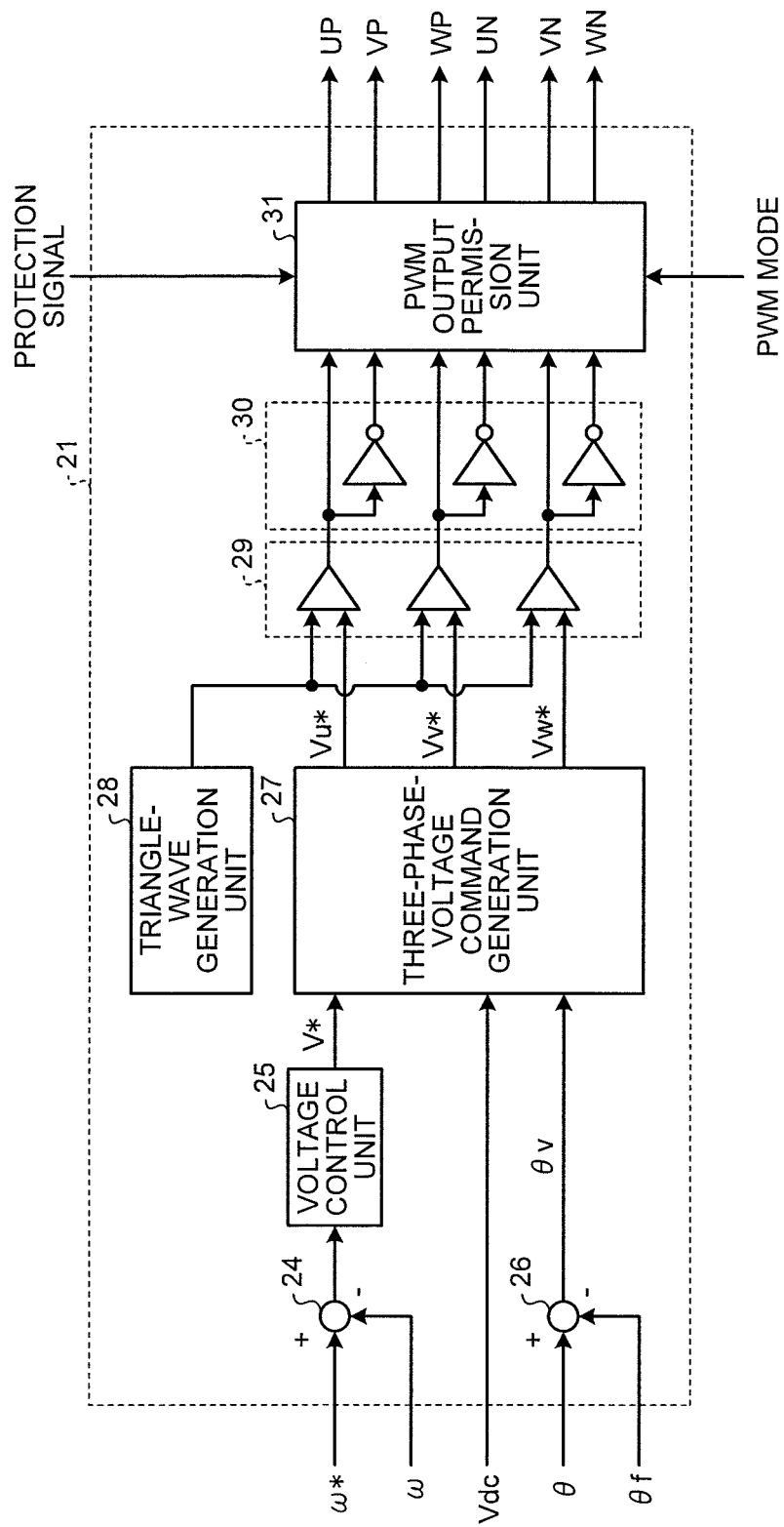
FIG. 4 is a diagram illustrating a configuration of a PWM output unit.

Next, the PWM output unit 21 is explained. FIG. 4 is a diagram illustrating a configuration of the PWM output unit 21. The PWM output unit 21 includes an adder-subtracter 24, a voltage control unit 25, an adder-subtracter 26, a three-phase-voltage command generation unit 27, a triangle-wave generation unit 28, a comparator 29, an inversion unit 30, and a PWM output permission unit 31.

The adder-subtracter 24 obtains a difference between the electrical-angle frequency command $\omega^*$ and the electrical angle frequency $\omega$; and the voltage control unit 25 obtains a voltage command V* by a control method typically represented by, for example, a proportional integration control. Furthermore, the adder-subtracter 26 adds the magnetic pole position $\theta$ to the lead angle $\theta f$ to obtain a voltage phase $\theta v$ as a conduction phase to the inverter 14.

The three-phase-voltage command generation unit 27 obtains voltage commands Vu*, Vv*, and Vw* of three phases based on the voltage command V*, the direct-current voltage Vdc, and the voltage phase θv by the following three equations (1) to (3).

Equation 1

$$V_u^* = \frac{2V^*}{V_{dc}}\sin(\theta_v) = \frac{2V^*}{V_{dc}}\sin(\theta + \theta_f) \quad (1)$$

Equation 2

$$V_v^* = \frac{2V^*}{V_{dc}}\sin\left(\theta_v - \frac{2}{3}\pi\right) = \frac{2V^*}{V_{dc}}\sin\left(\theta + \theta_f - \frac{2}{3}\pi\right) \quad (2)$$

Equation 3

$$V_w^* = \frac{2V^*}{V_{dc}}\sin\left(\theta_v + \frac{2}{3}\pi\right) = \frac{2V^*}{V_{dc}}\sin\left(\theta + \theta_f + \frac{2}{3}\pi\right) \quad (3)$$

In this case, when the lead angle θf in the above equations is set optimally, it becomes possible to apply a voltage with an optimal conduction phase, and this can contribute to improvement of operation efficiency of the permanent magnet synchronous motor 7.

In the above descriptions, while a voltage-command generation method which is a very basic one has been applied for the explanation using the equations (1) to (3), it is needless to mention that there is no problem when using any other voltage command generation method including modulation such as third harmonic superimposition modulation, spatial vector modulation, three-phase modulation, two-phase modulation, and the like.

Figure 5:
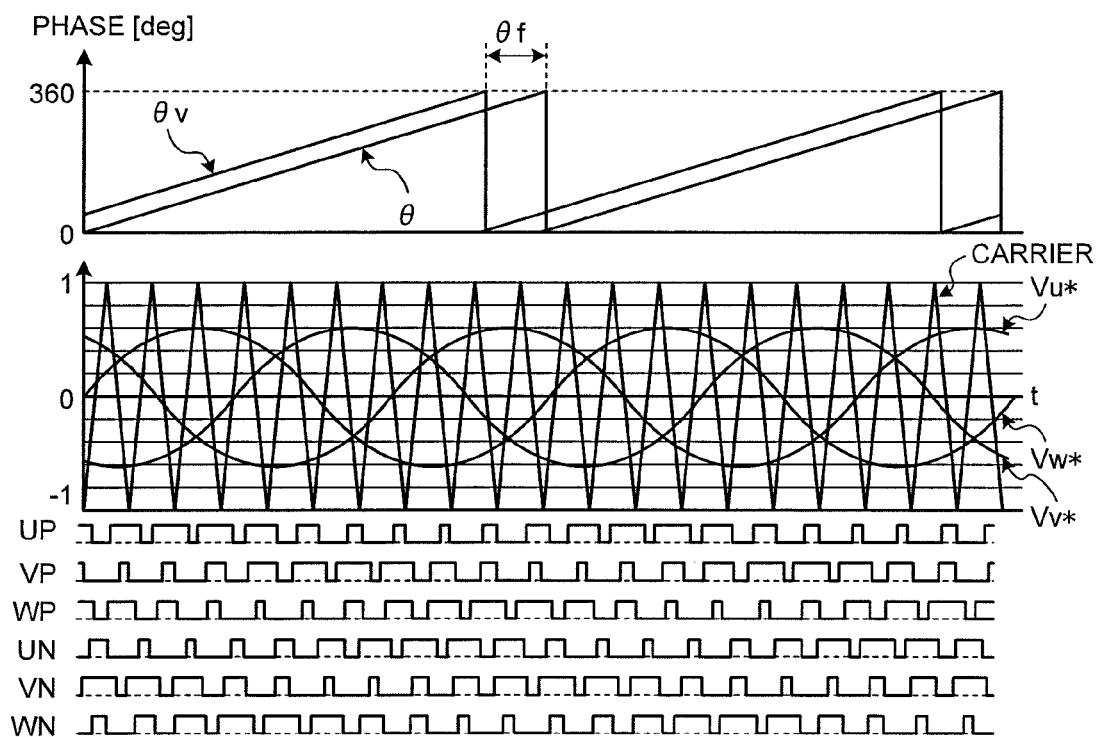
FIG. 5 is a diagram illustrating an operation of the PWM output unit.

Next, operations of the PWM output unit 21 are explained. As shown in FIG. 4 and FIG. 5, the PWM output unit 21 outputs signals of "High" and "Low" in the comparator 29 based on a magnitude relation between values of the voltage commands Vu*, Vv*, and Vw* of three phases obtained by the equations (1) to (3) and a triangle wave carrier output from the triangle-wave generation unit 28. The PWM output unit 21 then inverses one of two branched signals by the inversion unit 30 and transmits a total of six signals to the PWM output permission unit 31. In this case, the PWM output permission unit 31 selects PWM outputs that are output based on PWM modes transmitted from the brake sequence 22 and the drive sequence 23; and the selected PWM outputs are output as PWM signals (UP, VP, WP, UN, VN, WN). The switching elements 12a to 12f of the inverter 14 are switch-controlled by these PWM signals; and thus a voltage generated based on a voltage command value can be applied to the permanent magnet synchronous motor 7.

When a protection signal is input to the PWM output unit 21, the PWM output permission unit 31 of the PWM output unit 21 regulates an output of the PWM signal so that the inverter 14 does not output any voltage. With this control, the inverter 14 can be protected. In FIG. 5, the PWM mode is a mode at the time of a drive sequence; and when it is a brake sequence, it is operated such that line-to-line short circuit or line-to-line open circuit in the permanent magnet synchronous motor 7 is caused by outputting the PWM signals UN, VN, and WN and stopping the output of the PWM signals UP, VP, and WP, or by performing a reversed operation thereof.

Next, the brake sequence 22 is explained. First, because the outdoor device 3 of the air conditioner 1 is exposed outdoor, when a strong wind caused by a typhoon or the like blows to the outdoor fan 10, the outdoor fan 10 is rotated. Therefore, a control is executed of decreasing the rotation number of the outdoor fan 10 by the brake sequence 22 before shifting to the drive sequence 23. By decreasing the rotation number of the outdoor fan 10, the condition of the outdoor fan 10 is approximated to a stopped condition, which makes it possible to securely drive the outdoor fan 10.

Next, a braking method with respect to the permanent magnet synchronous motor 7 is explained. First, a voltage equation in a rotating coordinate system (on a dq axis) at a normal time of the permanent magnet synchronous motor 7 is expressed by the following equation (4).

Equation 4

$$\begin{bmatrix} V_d \\ V_q \end{bmatrix} = \begin{bmatrix} R & -\omega L_q \\ \omega L_d & R \end{bmatrix} \begin{bmatrix} I_d \\ I_q \end{bmatrix} + \begin{bmatrix} 0 \\ \omega \phi_f \end{bmatrix} \quad (4)$$

In the equation (4), $V_d$ is a d-axis voltage, $V_q$ is a q-axis voltage, $I_d$ is a d-axis current, $I_q$ is a q-axis current, ω is an electrical angle frequency, R is a winding resistance, $L_d$ is a d-axis inductance, $L_q$ is a q-axis inductance, and $\phi_f$ is an induced voltage constant.

When the line-to-line short circuit of the permanent magnet synchronous motor 7 is caused, $V_d=V_q=0$ is satisfied, and therefore $I_d$ and $I_q$ are expressed by the following equation and the further following equation, respectively.

Equation 5

$$I_d = -\frac{\omega^2 \phi_f L_q}{R^2 + \omega^2 L_d L_q} \quad (5)$$

Equation 6

$$I_q = -\frac{\omega \phi_f R}{R^2 + \omega^2 L_d L_q} \quad (6)$$

Here, a torque $\tau_m$ generated at this time in the permanent magnet synchronous motor 7 is expressed by the following equation (7).

Equation 7

$$\tau_m = P_m\{\phi_f I_q + (L_d - L_q)I_d I_q\} \quad (7)$$

Here, $P_m$ in the equation (7) is the number of pair of poles of the permanent magnet synchronous motor 7. Further, motor constants (R, $L_d$, $L_q$, $\phi_f$) are generally fixed values. Therefore, as the currents $I_d$ and $I_q$ corresponding to ω shown in the equations (5) and (6) flow, the torque $\tau_m$ shown in the equation (7) can be obtained. A peak current $I_p$ that flows at the time of short circuit is expressed by the following equation (8).

Equation 8

$$I_p = \frac{\sqrt{2}}{\sqrt{3}} \cdot \sqrt{I_d^2 + I_q^2} = \frac{\sqrt{2}}{\sqrt{3}} \cdot \frac{\omega \phi_f \sqrt{R^2 + \omega^2 L_q^2}}{(R^2 + \omega^2 L_d L_q)} \quad (8)$$

Figure 6:
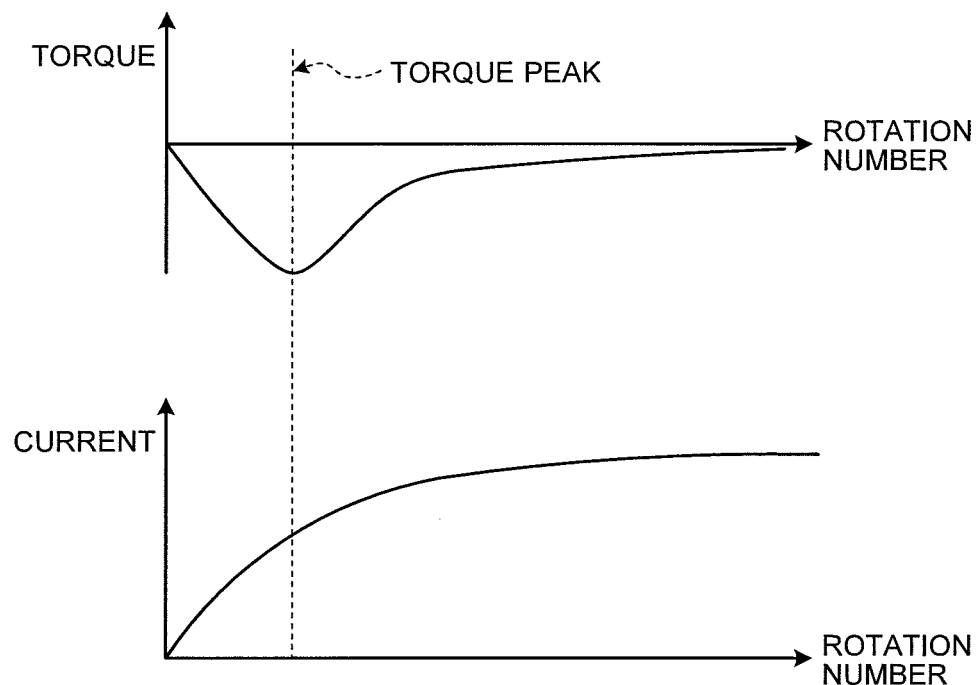
FIG. 6 is a diagram illustrating a rotation number characteristic of a torque and a current at the time of line-to-line short circuit of a permanent magnet synchronous motor.

FIG. 6 is a diagram illustrating a rotation number characteristic of a torque and a current at the time of short circuit of a general permanent magnet synchronous motor 7 based on the above equations (7) and (8). As shown in FIG. 6, the torque in this case works in a negative direction so as to hinder the rotation of a motor as the rotation number thereof is increased and hits its peak at a certain rotation number, and then the rotation number decreases. On the other hand, the current is increased along with the increase of the rotation number, and is saturated at a certain current value. That is, while a current flows as line-to-line short circuit is caused, because a torque in a negative direction that hinders the increase of the rotation number is generated, the permanent magnet synchronous motor 7 can be braked. While the torque hits its peak at a certain rotation number, in a case of the permanent magnet synchronous motor 7 used in the air conditioner 1, for example, it is generally designed to have the peak of the torque at a rotation equal to or less than 1000 rpm. Furthermore, in a normal time, an average wind speed of a wind that blows into the outdoor fan 10 is equal to or less than 10 m/s in most cases, which corresponds to the rotation equal to or less than 1000 rpm and the wind does not cause any problem on the braking of the permanent magnet synchronous motor 7.

Figure 7:
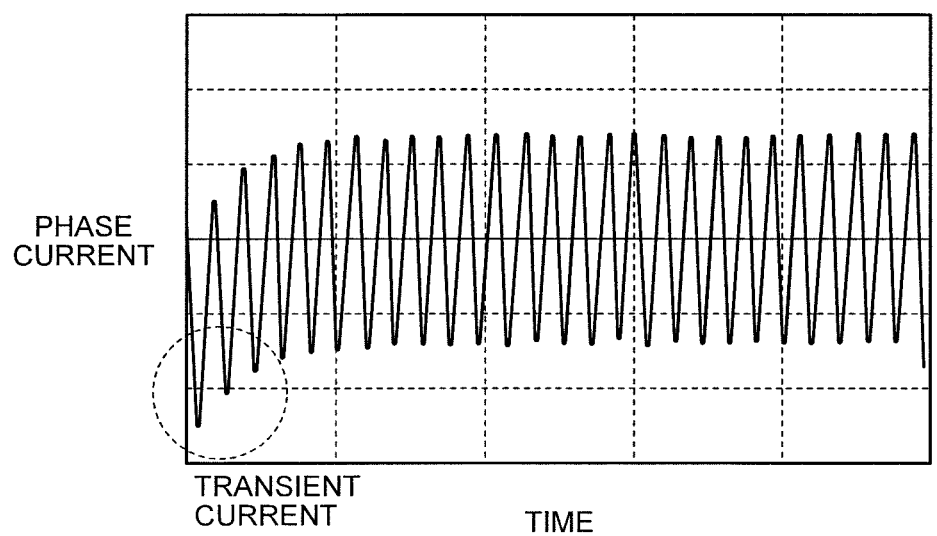
FIG. 7 is a diagram illustrating a current characteristic at the time of line-to-line short circuit of a permanent magnet synchronous motor.
Figure 8:
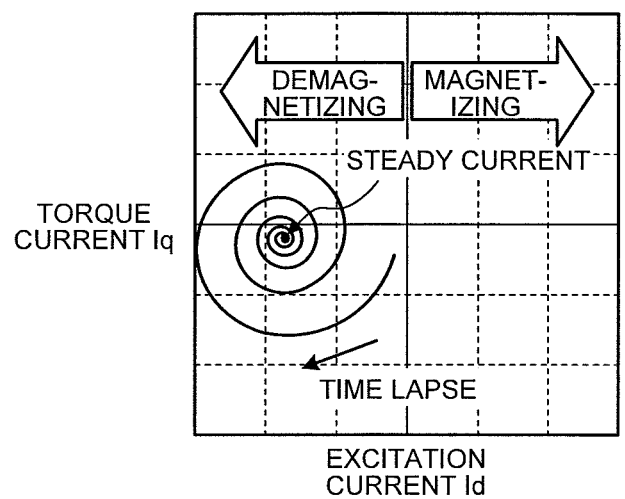
FIG. 8 is a diagram illustrating a dq-axis current characteristic at the time of line-to-line short circuit of a permanent magnet synchronous motor.

Note that while the peak current expressed by the equation (8) is a current at the time of a normal operation, in practice, at a moment short circuit occurs as shown in FIG. 7, a transient current of about one to two times of the peak current is generated. FIG. 8 is a diagram illustrating a case where the current shown in FIG. 7 is divided into the d-axis current $I_d$ as an excitation current and the q-axis current $I_q$ as a torque current. When short circuit starts, the current converges in a whirling shape to be a steady current, and it is understood that in this process, the d-axis current $I_d$ flows largely in a negative direction. When the d-axis current $I_d$ flows in a negative direction, irreversible flux loss is caused on a permanent magnet of the permanent magnet synchronous motor 7 and then the magnetic force of the permanent magnet cannot be regained, and thus there is a possibility that the performance of the permanent magnet synchronous motor 7 is degraded.

Figure 9:
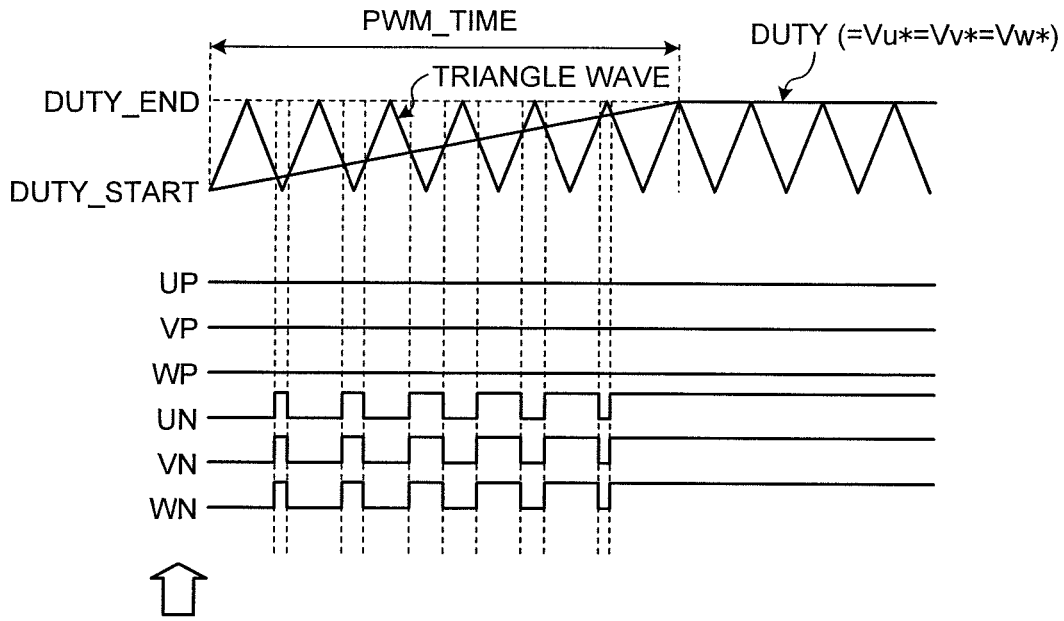
FIG. 9 is a diagram illustrating an operation for suppressing a transient current at the time of line-to-line short circuit of a permanent magnet synchronous motor.

In this connection, as shown in FIG. 9, as the voltage command (Vu*, Vv*, Vw*) instructing a comparison between a triangle wave and the DUTY that indicates a conduction ratio at the time of line-to-line short circuit of the permanent magnet synchronous motor 7, the DUTY is gradually increased from DUTY_START (a conduction ratio at the time of starting braking, also referred to as "starting-time conduction ratio") to DUTY_END (a conduction ratio at the time of ending braking, also referred to as "ending-time conduction ratio") during a time of PWM_TIME (a time from the "DUTY_START" to the "DUTY_END", also referred to as "braking control time"). In this case, among the PWM signals, a PWM mode is set such that the signals UP, VP, and WP do not operate, and the PWM mode is transmitted to the PWM output permission unit 31. Further, by setting the ratio of short circuit at the DUTY_END to be 100% (steadily short-circuited), the torque for braking as shown in FIG. 6 can be obtained.

Figure 11:
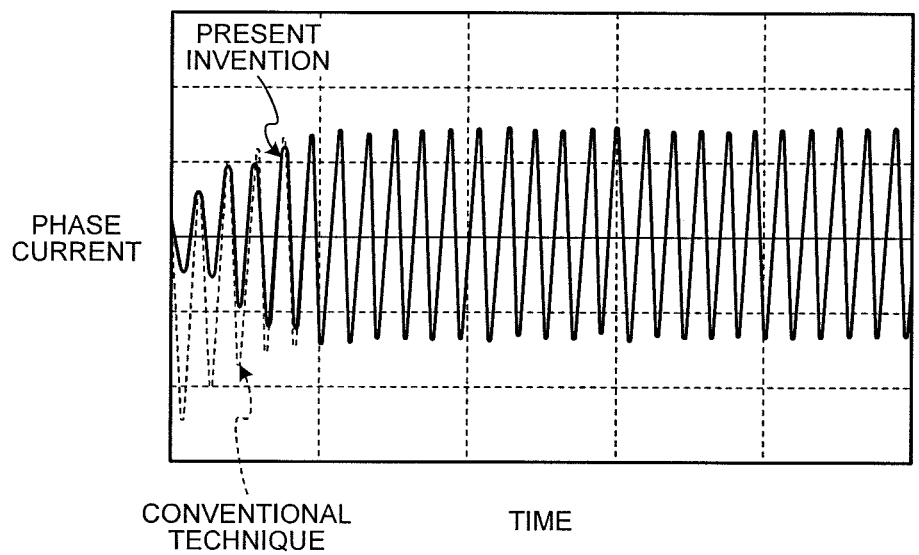
FIG. 11 is a diagram illustrating a current characteristic when a transient current is suppressed at the time of line-to-line short circuit of a permanent magnet synchronous motor.
Figure 12:
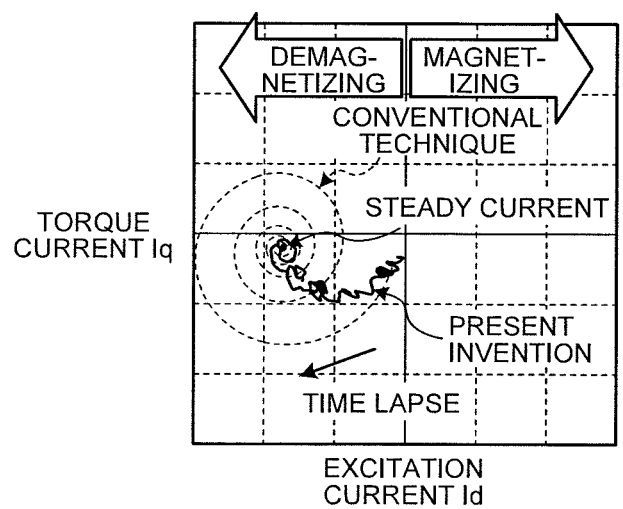
FIG. 12 is a diagram illustrating a dq-axis current characteristic when a transient current is suppressed at the time of line-to-line short circuit of a permanent magnet synchronous motor.

By performing operations as described above, as shown in FIG. 11, while suppressing an increase of a transient current, it becomes possible to decrease the rotation number of the permanent magnet synchronous motor 7 so as to approximate the condition of the permanent magnet synchronous motor 7 to a stopped condition. Further, as shown in FIG. 12 (refer to the waveform indicated by the solid line), it becomes possible to shift the current to a steady current in a state where flow of the d-axis current in a demagnetizing direction is suppressed. As a result, it becomes possible to prevent degradation of the performance of the permanent magnet synchronous motor 7 due to irreversible flux loss, and an operation of the permanent magnet synchronous motor 7 with improved efficiency can be constantly performed.

While suppressing effect of a transient current is improved by setting the PWM_TIME large, as open circuit and short circuit are repeated, a regenerative voltage generated by rotation of the rotor 9 of the permanent magnet synchronous motor 7 is regenerated in the direct-current power supply 5, and this regeneration causes rise of a direct current and there is a possibility of causing breakage of a circuit due to an over-voltage. Because the suppressing effect of a transient current and the pressure-rising amount of a direct-current voltage are in a trade-off relation, the PWM_TIME needs to be selected while taking into consideration both of a permissible amount of irreversible flux loss and a permissible amount of a direct-current voltage.

Figure 10:
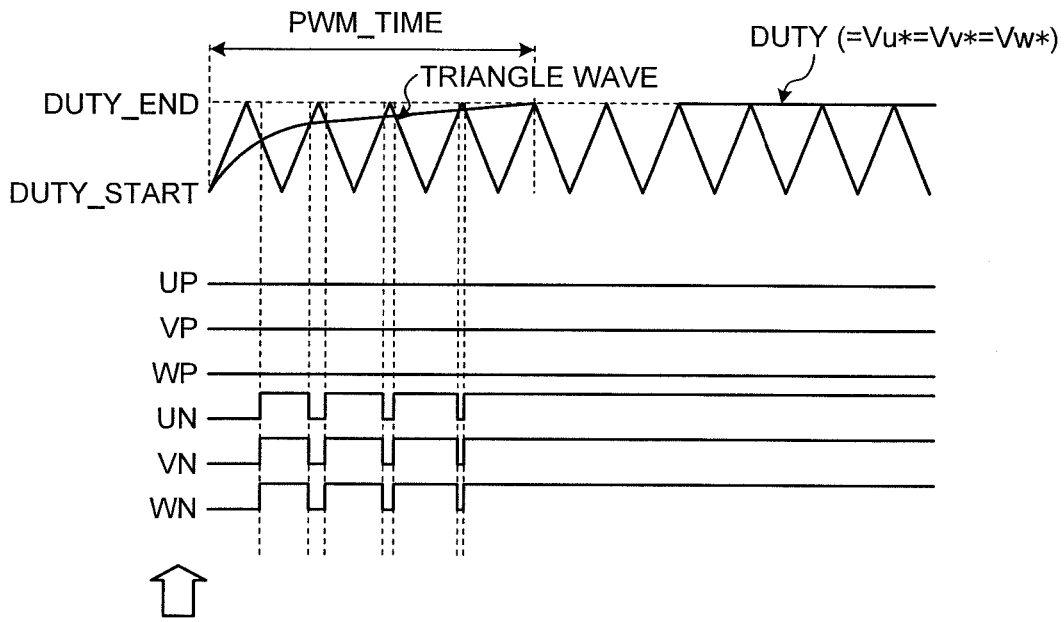
FIG. 10 is a diagram illustrating another operation for suppressing a transient current at the time of line-to-line short circuit of a permanent magnet synchronous motor.

Note that in practice, braking due to short circuit is caused only when the DUTY exceeds approximately 50%. Therefore, as shown in FIG. 10, it is possible to reduce the PWM_TIME by increasing the DUTY at an initial stage of the braking so as to make a change amount of the DUTY at the end of the braking small. Furthermore, with such control, even in a condition where the PWM_TIME is reduced, not only sufficient suppressing effect of a transient current can be obtained, but also the pressure-rising amount of a direct-current voltage can be suppressed.

Note that when there is a strong wind during short circuit and the outdoor fan 10 receives much of the wind, because a large torque is generated between the rotor 9 and the outdoor fan 10, the rotation number of a motor is increased; and if the rotation number exceeds the peak of the torque as shown in FIG. 6, not only braking cannot be made, but also there is a possibility that the current indicated in the equation (8) keeps flowing, and there is also a possibility that the inverter 14 as well as the permanent magnet synchronous motor 7 is heated to be in a high temperature condition. Furthermore, as for the permanent magnet synchronous motor 7, when rare-earth magnets are used therefor, there is a concern that irreversible flux loss is likely to occur when the permanent magnet synchronous motor 7 has a high temperature. However, in practice, a wind does not constantly blow in a same direction, and therefore if the rotation number is not decreased even when a short-circuit operation is performed, the short-circuit operation is stopped once, and then the operation is performed again after a certain period of time has elapsed. By executing such control, it becomes possible to brake the outdoor fan 10 while preventing heating of the inverter 14 as well as the permanent magnet synchronous motor 7.

A case is also assumed where the rotation number as the peak of the torque is exceeded before the brake sequence 22 is operated. In this case, there is a possibility that braking becomes difficult. In this case, it suffices to control the braking based on the electrical angle frequency ω that is output from the position/speed detection unit 20. To explain this control more specifically, when the rotation number is high, it is determined that sufficient heat exchange is performed in the refrigeration cycle 11 even without rotating the outdoor fan 10 and thus braking is not performed; and then the outdoor fan 10 is operated when the rotation number is decreased to a level at which the braking can be made, where a wind becomes light and the heat exchange amount becomes insufficient. With this control, heating of the permanent magnet synchronous motor 7 and the inverter 14 due to an unnecessary short-circuit operation can be suppressed, and secure braking with respect to the outdoor fan 10 can be made. Furthermore, when sufficient heat exchange is performed, forcible driving of the outdoor fan 10 is not necessary so that wasteful power consumption is avoided, thereby contributing to the prevention of the global warming.

At the time of starting the braking when the time of short circuit is short, there is a possibility that a current cannot be detected by the protection circuit 18. Therefore, when the current detection speed is slow (that is, in the present embodiment, when the capability of the protection circuit 18 is low), it is desirable to set the starting-time conduction ratio such that the time of short circuit becomes long. Therefore, it is preferable that the starting-time conduction ratio is set to correspond to the capability of the protection circuit 18, more specifically, the starting-time conduction ratio is set to be longer as the capability of the protection circuit 18 is lower.

Next, switching elements constituting the inverter 14 and a control time with respect to the switching elements are to be examined.

First, when the switching element 12a of the inverter 14 has a short-circuit fault, an excessive current flows from the direct-current power supply 5 to the inverter 14 through the switching elements 12a and 12d and the shunt resist 15. Normally, the inverter 14 is protected by the protection circuit 18 that protects the inverter 14 by detecting a current flowing to the shunt resist 15. However, when the DUTY_START is set to be 0%, the time of short circuit becomes short at the time of starting braking, and thus there is a possibility that the protection circuit 18 cannot detect the current, and in this case there is a risk that the inverter 14 becomes a high temperature condition. Therefore, in order to secure a time of short circuit that is long enough to securely protect the inverter 14 by the protection circuit 18, it is preferable to set the DUTY_START to be approximately 30%, for example.

Furthermore, a configuration is to be examined in which, among the switching elements 12a to 12f that constitute the inverter 14, the switching elements 12a to 12c are constituted by normally-off switching elements and the switching elements 12d to 12f are constituted by normally-on switching elements. This configuration is a configuration in which, even when the air conditioner 1 is in a stopped condition, the line-to-line short circuit of the permanent magnet synchronous motor 7 is steadily caused, that is, a configuration that can keep braking of the rotation of the outdoor fan 10 even without outputting any PWM signal. In this configuration, because there is line-to-line short circuit even before the outdoor fan 10 is rotated by a wind, a motor current is characterized such that, as shown in FIG. 6, it gradually increases along with an increase of the electrical angle frequency ω, and a transient current is not generated. Further, it becomes unnecessary to execute complicated control such as performing braking while changing the DUTY. Therefore, cost reduction can be achieved of a microcomputer that controls the air conditioner 1 and reduction of the number of parts.

Currently, a semiconductor generally made of silicon (Si) is mainly used for the switching elements 12a to 12f that constitute the inverter 14 and the reflux diodes 13a to 13f that are respectively connected to these switching elements in parallel. However, instead of such a semiconductor, a wide bandgap semiconductor made of silicon carbide (SiC), gallium nitride (GaN), or diamond can be also used.

Switching elements and diode elements formed of such a wide bandgap semiconductor have a high voltage endurance and a high permissible current density. Therefore, these switching elements and diode elements can be downsized, and by using such downsized switching elements and diode elements, a semiconductor module having these elements incorporated therein can be downsized.

Furthermore, the switching elements and diode elements formed of such a wide bandgap semiconductor has a high heat resistance. Therefore, downsizing of heat radiation fins of a heat sink and modifying a water cooling unit into air-cooling can be achieved, thereby achieving further downsizing of the semiconductor module.

Further, the switching elements and diode elements formed of such a wide bandgap semiconductor has low power loss. Therefore, high efficiency of these switching elements and diode elements can be achieved, thereby achieving high efficiency of the semiconductor module.

At the time of a short-circuit operation, an excessive current flows. Therefore, for example, when line-to-line short circuit of the permanent magnet synchronous motor 7 is caused by turning ON of the switching elements 12d to 12f, a current flows in the switching elements 12d to 12f and the reflux diodes 13d to 13f. Therefore, by configuring such that a wide bandgap semiconductor is used only for paths in which the current flows, it becomes possible to cover the degradation of the performance of a cooler; and the cost and size of the cooler can be reduced, while suppressing cost increase due to introduction of the wide bandgap semiconductor.

As described above, by using switching elements formed of a wide bandgap semiconductor as the normally-on switching elements mentioned above, even when line-to-line short circuit of the permanent magnet synchronous motor 7 is caused and a short-circuit current keeps flowing in the switching elements, the loss caused by the short-circuit current can be reduced. Furthermore, along with the reduction of a heat generation amount due to the fact the loss can be reduced, good resistance characteristics to a high temperature are achieved, and thus requirements can be relaxed with regard to the heat generation amount and operation temperature of the switching elements, which are steadily in a short circuit state.

By the control of the brake sequence 22 described above, when the outdoor fan 10 is rotated by an external force such as a wind, it is possible to lower the rotation number of the outdoor fan 10 to that of a substantially stopped state, and the condition of the outdoor fan 10 can be approximated to a stopped state where there is no wind. With this configuration, after confirming a decrease of the rotation number to that equal to or less than a predetermined rotation number, by shifting to the drive sequence 23, the drive control in a previous technique starting from a stopped state can be applied as it is, and thus it is not necessary to establish any complicated drive control. With this configuration, it becomes possible to use other devices such as an inexpensive control microcomputer.

Figure 13:
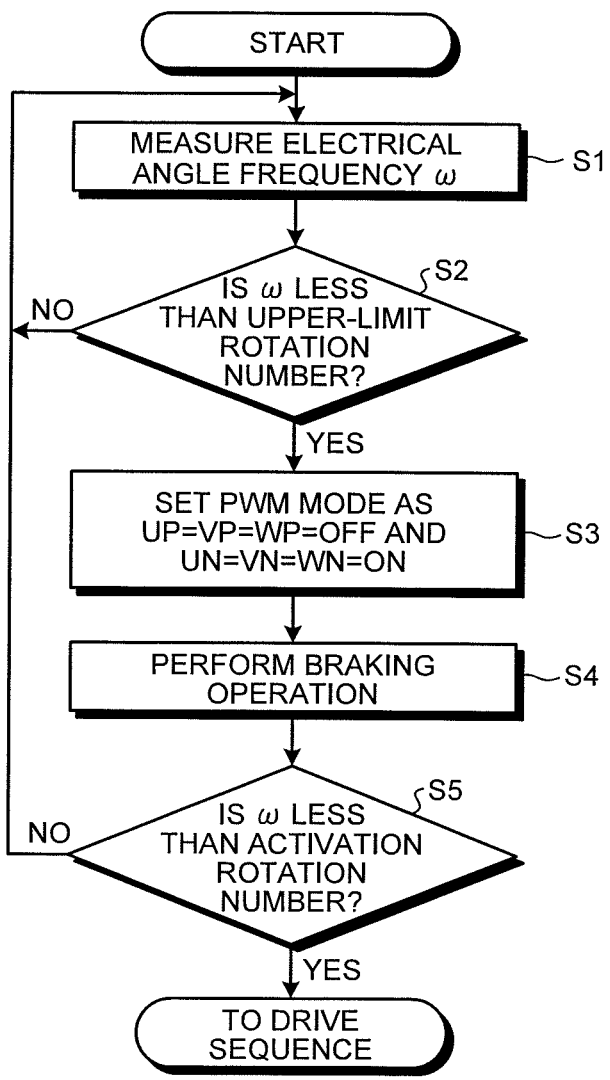
FIG. 13 is a flowchart of a brake sequence.

FIG. 13 is an example of a flowchart showing an operation of the brake sequence in the first embodiment described above. Specifically, this operation can be realized by the following processes at Steps S1 to S5.

(S1: Rotation-Number Measuring Step)

The position/speed detection unit 20 measures the magnetic pole position θ and the electrical angle frequency ω of the rotor 9 of the permanent magnet synchronous motor 7 based on the outputs Hu, Hv, and Hw of the magnetic-pole-position detection unit 16.

(S2: Upper-Limit Rotation-Number Determining Step)

Based on the electrical angle frequency ω measured at Step S1, when a measured rotation number exceeds the upper-limit rotation number as a driving-permission rotation number set in advance (NO at Step S2), it is determined that braking cannot be made and the process returns to Step S1. On the other hand, when the measured rotation number is less than the upper-limit rotation number (YES at Step S2), it is determined that braking can be made, and the process shifts to Step S3.

(S3: PWM-Mode Changing Step)

At the time of braking due to short circuit, the braking is made by simultaneously turning ON the switching elements 12a to 12c or 12d to 12f of the inverter 14, and thus any one of these sets of the switching elements are set to be in a normally-off condition. While described as UP=VP=WP=OFF and UN=VN=WN=ON in FIG. 13, the relation can be reversed, that is, as UP=VP=WP=ON and UN=VN=WN=OFF.

(S4: Braking Step)

At Step S4, as shown in FIG. 9, the DUTY (=Vu*=Vv*=Vw*) that is compared to a triangle wave is gradually increased from the "DUTY_START" to the "DUTY_END" during the time PWM_TIME, and the ratio of the short circuit of the "DUTY_END" is set to be 100% (steadily short-circuited), thereby executing control of decreasing the rotation number of the permanent magnet synchronous motor 7 while suppressing an increase of a transient current.

(S5: Activation-Rotation-Number Determining Step)

When a braking operation at Step S4 is performed, the electrical angle frequency ω is gradually reduced. At Step S5, the measured value of the measured electrical angle frequency ω is compared to a predetermined activation rotation number. When the measured value of the measured electrical angle frequency ω does not become equal to or less than the activation rotation number (NO at Step S5), the process returns to Step S1. That is, in a case where the braking is set not to operate until the electrical angle frequency ω becomes equal to or less than the activation rotation number, the braking operation is stopped, and then the braking operation is resumed after a certain period of time has elapsed. On the other hand, in a case where the measured value of the electrical angle frequency ω becomes equal to or less than the activation rotation number (YES at Step S5), that is, when the electrical angle frequency ω is braked to be equal to or less than the activation rotation number, the process shifts to a drive sequence. When the process shifts to the drive sequence, a signal is issued indicating shifting to the drive sequence, and a drive operation of the permanent magnet synchronous motor 7 is started. With this operation, activation can be made under a condition that is close to a stopped state of the permanent magnet synchronous motor 7, and power running of the permanent magnet synchronous motor 7 can be securely and swiftly performed.

Next, the drive sequence 23 is explained. In the drive sequence 23, a drive operation is started by receiving a signal that is issued from the brake sequence 22 and that indicates shifting (see FIG. 2). The drive sequence 23 outputs, while having the electrical angle frequency ω as its input, the electrical-angle frequency command ω*, the lead angle θf, and the PWM mode to the PWM output unit, and outputs the PWM (UP, VP, WP, UN, VN, WN) as described above, thereby driving the permanent magnet synchronous motor 7. In this case, the electrical-angle frequency command ω* is changed accordingly depending on the driving conditions of the refrigeration cycle 11, and the voltage command V* is generated so as to follow the electrical-angle frequency command ω*.

Figure 14:
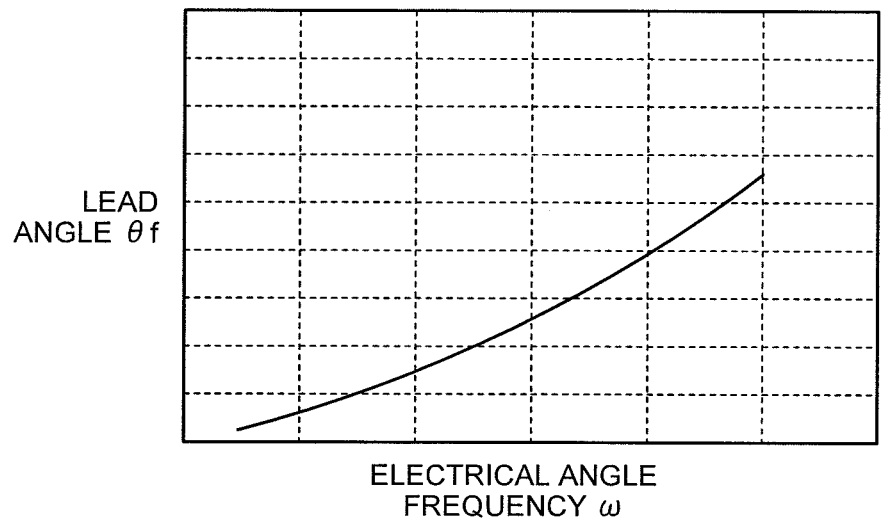
FIG. 14 is a chart expressing a relation between an electrical angle frequency $\omega$ and an optimal lead angle $\theta f$ when applied with no load.

Generally, because the blade of the outdoor fan 10 has a propeller-shape, the load of the outdoor fan 10 is increased according to the electrical angle frequency ω. Meanwhile, with respect to respective loads that fluctuate, the lead angle θf for driving the outdoor fan 10 at the maximum efficiency point has characteristics as shown in FIG. 14. That is, with respect to the electrical angle frequency ω, the lead angle θf for driving the outdoor fan 10 at the maximum efficiency point needs to be increased as shown in FIG. 14. Therefore, in the drive sequence, if configured that information on the lead angle θf with respect to the electrical angle frequency ω is stored in advance as table data or a formula, optimum driving can be performed.

Figure 15:
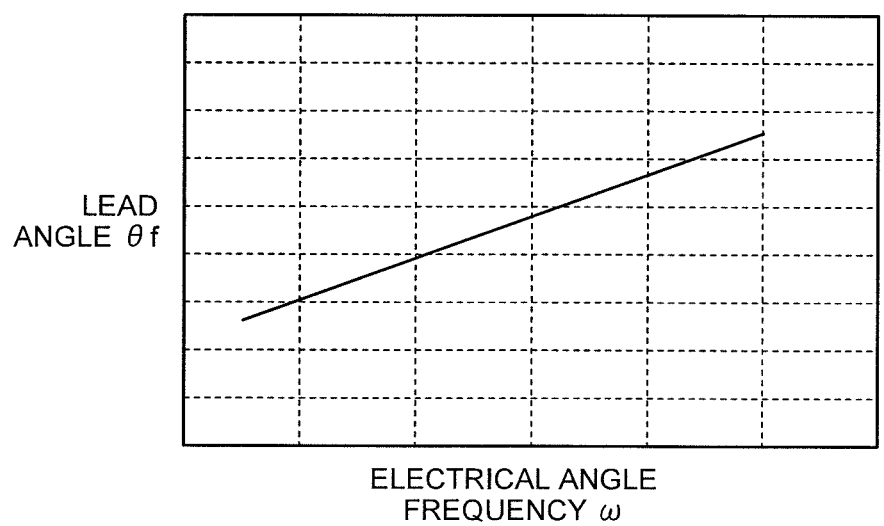
FIG. 15 is a chart expressing a relation between the electrical angle frequency $\omega$ and the optimal lead angle $\theta f$ when there is a strong wind.

Further, when the outdoor fan 10 receives a wind, depending on the direction of the wind, a case where there occurs a torque that hinders power running and a substantial load increases. When the outdoor fan 10 becomes under such a condition, the lead angle θf for optimum driving is changed to have such characteristics as shown in FIG. 15, and there is a possibility that, when the lead angle θf shown in FIG. 14 has been applied, the angle is deviated from the optimum point, and then a current increase and a rotation number decrease due to lacking of an output torque of the permanent magnet synchronous motor 7 occur. Therefore, in order to avoid such problems in the case of load increase, it is preferable to previously prepare fluctuation characteristics of the lead angle θf in the case of load increase or to select in advance several candidate values of the lead angle θf in the case of load increase.

Immediately after shifting to the drive sequence 23, an output voltage is set low. Therefore, when the load is increased due to a wind, there is a possibility of an activation failure due to shortage of an output voltage or of an increase of an activation time. Accordingly, in the brake sequence 22, because it is possible to measure the rotation number of the outdoor fan 10 under a condition where the inverter 14 is not operated, it is preferable to estimate what extent of wind is blowing based on a measured rotation number and to select in advance several candidate values corresponding to the load according to the voltage command V* and the lead angle θf at the time of shifting to the drive sequence 23. At the time of shifting to the drive sequence 23, by performing secure activation using an appropriate voltage command V* and lead angle θf and by operating such that the lead angle θf after completing the activation gradually converges to a value indicated in the table data and the like mentioned above, a risk of adverse effects on a steady operation can be considerably lessened.

As explained above, in the air conditioner according to the present embodiment, in a case where the outdoor fan 10 is rotated by an external force when the inverter is stopped, after the inverter 14 is operated by the brake sequence 22 that brakes the rotation of the outdoor fan 10, the inverter 14 is operated by the drive sequence 23 that performs power running of the outdoor fan 10. Accordingly, even in a condition where the outdoor fan 10 of the outdoor device 3 is exposed to a strong wind, as far as braking can be made, it becomes possible to securely drive the permanent magnet synchronous motor 7 and to send air to the refrigeration cycle 11.

Furthermore, when the air conditioner is exposed to such a strong wind as to make it unable to brake, it is configured to determine that sufficient heat exchange is performed even without rotating the outdoor fan 10 so that the braking by a short-circuit operation is not performed, and is configured to control the braking when the rotation number is decreased to a level at which the braking is operable, where the wind is light and the heat exchange amount becomes insufficient. Accordingly, a condition where heat exchange of the refrigeration cycle 11 is sufficiently performed can be steadily maintained, and it becomes possible to relieve frustrations of users caused by insufficient cooling or heating (insufficient heat exchange) due to an activation failure and the like.

The configurations described in the above embodiments are only an example of the configuration of the present invention. These configurations can be combined with other publicly known techniques, and it is needless to mention that the present invention can be configured while modifying it without departing from the scope of the invention, such as omitting a part the configuration.

Please note that in the above embodiments, the contents of the present invention have been explained assuming the present invention being directed to an air conditioner including a refrigerant cycle; however, the application field of the present invention is not limited thereto, and the invention is applicable to devices such as a heat-pump water heater including a refrigerant cycle, a refrigeration device, a ventilation air blower, and the like.

INDUSTRIAL APPLICABILITY

As described above, the present invention is useful as an air conditioner that is capable of safely and securely braking a permanent magnet synchronous motor and is capable of securely shifting its mode to power running.

The invention claimed is:

1. An air conditioner in which an indoor device and an outdoor device are separately provided, the air conditioner comprising:
an outdoor fan that is provided in the outdoor device;
a permanent magnet synchronous motor that drives the outdoor fan;
an inverter of which power is supplied from a direct-current power supply and which applies a voltage to the permanent magnet synchronous motor;
an inverter control unit that controls a voltage output from the inverter;
a current detection unit that is connected between the direct-current power supply and the inverter; and
a protection circuit that detects a current flowing through the current detection unit and executes a protection thereof,
wherein
the inverter control unit includes a brake sequence that brakes a rotation of the outdoor fan, and
the brake sequence sets a starting-time conduction ratio, which is a conduction ratio at a time of starting braking, such that the protection circuit is able to detect the current flowing through the current detection unit.

2. The air conditioner according to claim 1, wherein
the inverter control unit has a drive sequence in which the inverter is operated by the brake sequence, and thereafter the outdoor fan is run on a power running, and
the drive sequence changes an output voltage and a conduction phase of the inverter based on information on a rotation number of the outdoor fan during an operation of the brake sequence.

3. The air conditioner according to claim 1, wherein
in the brake sequence, a control of performing a line-to-line open circuit and a line-to-line short-circuit of the permanent magnet synchronous motor is executed based on information on a conduction ratio, wherein
the information on a conduction ratio is set such that a time period of short circuit becomes longer along with a time lapse of brake control and is set so as to be in a range from the starting-time conduction ratio to an ending-time conduction ratio which is a conduction ratio at a time of ending braking.

4. The air conditioner according to claim 1, wherein
in the brake sequence, when a rotation number of the outdoor fan is unable to be braked to equal to or less than a driving-permission rotation number, the braking is stopped, and then the braking is performed again after a certain period of time has lapsed.

5. The air conditioner according to claim 1, wherein
when a rotation number of the outdoor fan becomes equal to or larger than a driving-permission rotation number, it is determined that sufficient heat exchange can be performed in the outdoor device and the brake sequence shifts to a standby mode, and
when the rotation number becomes equal to or less than the driving-permission rotation number, a braking operation is performed.

6. The air conditioner according to claim 1, wherein
among semiconductor switching elements constituting the inverter, one set of elements connected to a positive side or a negative side of the direct-current power supply is constituted from normally-on switching elements, and
the brake sequence maintains the inverter in a stopped state.

7. The air conditioner according to claim 1, wherein
the inverter control unit has a drive sequence in which the inverter is operated by the brake sequence, and thereafter the outdoor fan is run on a power running, and
when the braking of causing a rotation number of the outdoor fan to be equal to or less than a driving-permission rotation number is completed, the brake sequence is ended and is shifted to the drive sequence.

8. The air conditioner according to claim 1, wherein
semiconductor switching elements constituting the inverter are formed from a wide bandgap semiconductor.

9. The air conditioner according to claim 1, wherein
in the inverter, a wide bandgap semiconductor is used only for paths in which a current flows at the time of the short-circuit operation.

10. The air conditioner according to claim 2, wherein
the drive sequence, in a case where the rotation number of the outdoor fan during an operation of the brake sequence is high, increases an applied voltage and a conduction phase at a time of activation.

11. The air conditioner according to claim 3, wherein
an increment from the starting-time conduction ratio to the ending-time conduction ratio is large at a time of outputting the starting-time conduction ratio, and
the increment becomes smaller as a time lapse approaches a time of outputting the ending-time conduction ratio.

12. The air conditioner according to claim 3, wherein
in the brake sequence, the starting-time conduction ratio is set according to a current detection speed of the current detection unit.

13. The air conditioner according to claim 12, wherein
when the current detection speed is slow, the starting-time conduction ratio is set such that a time period of short circuit is long.

14. The air conditioner according to claim 3, wherein
at a time of ending the brake sequence, the ending-time conduction ratio is set such that a short-circuit operation is a steady operation.

15. The air conditioner according to claim 8, wherein
the wide bandgap semiconductor is made of silicon carbide, gallium nitride, or diamond.

16. The air conditioner according to claim 9, wherein
the wide bandgap semiconductor is made of silicon carbide, gallium nitride, or diamond.

* * * * *